2,752,262

LINOLEUM CEMENTS CONTAINING TALL OIL PARTIAL ESTERS

Lawrence H. Dunlap, Lancaster Township, Lancaster County, Pa., assignor to Armstrong Cork Company, Lancaster, Pa., a corporation of Pennsylvania No Drawing. Application December 27, 1950,
Serial No. 203,017

15 Claims. (Cl. 106—123)

This invention relates to linoleum compositions. More particularly, the invention relates to a linoleum cement containing a partially esterified tall oil.

Linoleum cements have been made for a number of years from a drying oil and a resin by a number of methods, which result in the production of a siccative oil-resin gel by oxidizing and polymerizing the drying oil, generally in the presence of the resinous material. Ordinarily, linoleum cements comprise about 65% to about 85% drying oil and about 15% to about 35% resin. For many years, linoleum cements were manufactured from a resin such as rosin and a siccative oil such as a drying oil; for example, linseed oil, or a semi-drying oil; for example, soya bean oil. However, recently other materials have been proposed for use in place of a portion or all of the drying oil components or the resin components of the linoleum cement. For example, tall oil has been proposed as a replacement for a portion of the drying oil component of the cement.

Tall oil is a by-product of the manufacture of kraft paper by the sulphate process from pine or fir wood and is generally considered to be a mixture of fatty acids, resin acids, and unsaponifiable materials. Generally speaking, a typical crude tall oil contains about 35% to about 50% resin acids, about 40% to about 50% fatty acids, and about 5% to about 10% sterols, hydrocarbons and other unsaponifiables. The fatty acids fraction includes saturated fatty acids, oleic acid, and linoleic acid. Linoleum cements containing substantial quantities of tall oil have been prepared and successfully employed in the manufacture of linoleum compositions. These compositions may be employed in the preparation of floor or wall coverings which have generally the flexibility and resilience found in linoleum which is prepared from a siccative oil-resin gel produced by the oxidation and polymerization of a drying oil such as linseed oil, and a resin such as rosin.

Generally speaking, however, cements containing tall oil are somewhat more thermoplastic than ordinary linoleum cements; and floor coverings manufactured from compositions containing such cements may soften at elevated temperatures, thereby resulting in excessive indentation and a fairly high degree of dirt retention. Thus, these floor coverings may be adversely affected in warm climates or under extreme summer conditions. In adition, the substitution of tall oil for a portion of the drying oil in the formulation of linoleum cement requires the conventional amount of rosin present. In other words, in order to successfully prepare a cement from a drying oil-tall oil mixture, considerable quantities of rosin must be present, thereby reducing the alkali resistance of the material. Furthermore, the free fatty acids in tall oil further reduce the alkali resistance, and are detrimental to the drying properties of the composition.

In my copending application Serial No. 68,417, filed December 30, 1948, now abandoned, I have described the preparation of a drying oil substitute comprising heating tall oil at selected temperatures in the presence of selected amounts of polyhydric alcohol. I have now found that the esterification products of the type obtained by that process may be utilized in the production of a linoleum cement without removal of the resin acids. In accordance with my invention, highly desirable linoleum cements may be prepared from oxidizing and polymerizing a mixture containing reduced amounts of drying oil and a substantial amount of the esterification products referred to in my above-mentioned copending application. If desired, the cements of my invention may be prepared from mixtures containing small amounts of rosin or equivalent resins.

In accordance with the invention described and claimed in said copending application, the tall oil is selectively esterified under carefully controlled conditions with a polyhydric alcohol containing from three to five carbon atoms, such as glycerol and pentaerythritol. By such a procedure, only the fatty acids of the tall oil are esterified; and the rosin remains unesterified. In order to obtain selective and substantially complete esterification of the fatty acid constituents of the tall oil, the temperature should be at least 180° C. Depending upon the time of the esterification step, higher temperatures may be used, but in no event should these temperatures exceed about 250° C.; for at this temperature and above a significant portion of the rosin component of the tall oil is esterified and contaminates the desired drying oil substitute residue. In operating at higher temperatures, it is advantageous to reduce the time of exposure of the tall oil to the polyhydric alcohol as more desirable products are obtained at the higher end of the temperature range when the time of treatment is reduced. For instance, at a temperature of 220° C., selective esterification is accomplished in about one hour, whereas at a temperature of 250° C., selective esterification occurs in about 15 to 20 minutes. In any event, the reaction is allowed to proceed until the total acid number of the reaction mass approximates the rosin acid number.

A typical example of the preparation of the partially esterified material employed in the practice of this invention is the following:

EXAMPLE I 1202.1 grams of a tall oil having a fatty acid number of 70, a rosin acid number of 96, and a total acid number of 166 were placed in a two-liter flask and heated to 150° C. At this point, 59.7 grams of pentaerythritol were added. When the temperature reached 180° C., lead napthenate catalyst was added to start the esterification reaction. After one-half hour to allow the pentaerythritol to dissolve, a sample was taken and the acid number was determined. The reaction was continued with agitation for ten hours at about 180° C. At this time, the total acid number was 95.7, and the rosin acid number was 89.1, indicating that all but an insignificant amount of the fatty acids was esterified and that all but an insignificant amount of rosin acids was not esterified.

EXAMPLE II 1137.2 grams of tall oil having a fatty acid number of 74, a rosin acid number of 93, and a total acid number of 167 were placed in a two-liter flask and heated up to 150° C., at which point 59.7 grams of pentaerythritol were added. When the temperature reached 180° C., lead napthenate catalyst was added to initiate the reaction. After allowing one-half hour for the pentaerythritol to dissolve, the first sample was taken and the acid numbers determined. The reaction mixture was then heated for 8½ hours at 180° C.; and at the end of this time the total acid number was 94.5, the rosin acid number was 87.6, thus indicating that all but an insignificant amount of the fatty acids was esterified and that all but an insignificant amount of the rosin acids was not esterified.

It is to be noted that an excess of polyhydric alcohol esterifying agent is used in the above example; and I have found that it is preferable to use a slight excess, such as 1.1 equivalent of polyhydric alcohol for each equivalent of tall oil fatty acids to be esterfied. In place of the lead napthenate catalyst used in the examples, other esterification catalysts, such as sulphuric acid, p-toluene sulfonic acid, litharge, and the like, may be used.

In accordance with this invention, partially esterified tall oil produced in accordance with the above examples may be mixed with rosin or other resins generally utilized in the manufacture of linoleum cement; for example, copal, kauri gum, congo gum, other naturally occurring resins and synthetic resins, and any drying or semi-drying oil commonly employed in the manufacture of linoleum cement, and the resulting mixture may be oxidized in conventional cement-making equipment to produce a highly desirable binder which can be compounded with other ingredients to produce linoleum compositions in the conventional manner. In the broadest phase of my invention, a partial ester of tall oil is employed in conjunction with a drying oil such as linseed oil and in the absence of any rosin. Upon subjecting this mixture to oxidation and polymerization conditions, a very desirable cement is produced. Generally speaking, I may replace from about 18% to about 35% of the normal linseed oil content of a linoleum cement formulation with the partial ester of tall oil described hereinabove. Generally speaking, when all of the rosin is replaced, I can replace about 30% of the linseed oil. When approximately half of the rosin is replaced, I can replace about 18% of the linseed oil.

The following table is illustrative of the various compositions within the scope of my invention:

*Table A*

| | | | | |
|---|---|---|---|---|
| Partial Ester of Tall Oil......percent.. | 50 | 60 | 25 | 10 |
| Siccative Oil................do.... | 50 | 40 | 12.5 | 80 |
| Resin......................do.... | | | 12.5 | 10 |

Expressed differently, the compositions of my invention comprise about 10% to 60% by weight partial ester of tall oil, about 50% to 80% by weight siccative oil, such as linseed oil, and about 0% to 12.5% by weight resin, such as rosin.

Generally speaking, I find it advantageous to maintain the resin acid content of the compositions between about 15% and about 35% by weight.

Generally speaking, conventional conditions of cement preparation are followed in carrying out my invention. For instance, the mixture is charged to a mechanical oxidizer and blown with air while being agitated at a temperature between about 160° F. and 240° F. The material is subjected to these conditions for a period of about 24 hours or more.

In order to more fully understand my invention, reference may be had to the following specific examples which are given by way of illustration but not by way of limitation:

EXAMPLE III

Parts by weight
Linseed oil _____ 307.5
Rosin _____ 62.5
Partial ester of tall oil_____ 130.0

EXAMPLE IV

Linseed oil _____ 375.0
Partial ester of tall oil_____ 125.0

EXAMPLE V

Linseed oil _____ 187.5
Rosin _____ 125.0
Partial ester of tall oil _____ 187.5

EXAMPLE VI

Linseed oil _____ 261.0
Partial ester of tall oil _____ 239.0

Cements prepared in accordance with the above examples may be compounded with conventional fillers, such as cork, wood flour, and the like, and various pigments to produce very desirable linoleum compositions. A typical linoleum composition is as follows:

Parts by weight
Wood flour _____ 73
Whiting _____ 117
Cement _____ 112

By means of my invention I have provided a good, inexpensive linoleum cement formulation. The product is characterized by the fact that it can be used in conventional equipment to produce linoleum floor or wall coverings exhibiting very desirable properties. It is much less expensive than conventional cements, inasmuch as it utilizes inexpensive raw materials, and, in fact, may eliminate entirely some material which has been formerly considered to be essential in the production of worthwhile linoleum compositions.

As used herein, the term "siccative oil" or its equivalent is intended to include drying oils and semi-drying oils.

While I have shown that advantageous results may be obtained in the practice of my invention utilizing tall oil esters obtained in accordance with my copending application, I may employ tall oil esters of polyhydric alcohol containing more than three to five carbon atoms. For example, I may employ esters of sorbitol, mannitol, tetramethylol cyclohexanol, and the like.

I claim:

1. A linoleum cement obtained by oxidizing by agitating in air at a temperature between about 160° F. and 240° F. a mixture containing a siccative fatty oil and a partially esterified tall oil produced by selective esterification of only the fatty acid content of tall oil with a polyhydric alcohol containing 3–5 carbon atoms.

2. A linoleum composition comprising a filler, a pigment, and the linoleum cement of claim 1.

3. A linoleum cement obtained by oxidizing by agitating in air at a temperature between about 160° F. and 240° F. a mixture containing a siccative fatty oil, a partially esterified tall oil produced by selectively esterifying the fatty acid content of tall oil by means of a polyhdric alcohol containing 3–5 carbon atoms, and rosin.

4. A linoleum composition comprising a filler, a pigment, and the linoleum cement of claim 3.

5. A linoleum cement obtained by oxidizing by agitating in air at a temperature between about 160° F. and 240° F. a mixture containing about 50% to 80% by weight of a siccative fatty oil, up to about 12.5% by weight of rosin, and about 10% to 60% by weight of a partially esterified tall oil produced by esterification of tall oil with a polyhydric alcohol containing 3–5 carbon atoms at a temperature between about 180° C. and about 250° C.

6. A linoleum cement obtained by oxidizing by agitating in air at a temperature between about 160° F. and 240° F. a fatty drying oil in the presence of a partially esterified tall oil produced by esterification of tall oil with a polyhydric alcohol containing 3–5 carbon atoms, said esterification being conducted at a temperature between about 180° C. and about 250° C.

7. A linoleum cement obtained by oxidizing by agitating in air at a temperature between about 160° F. and 240° F. a mixture containing linseed oil and a partially esterified tall oil produced by esterifying tall oil by means of glycerol at a temperature between about 180° C. and about 250° C.

8. A linoleum cement obtained by oxidizing by agitating in air at a temperature between about 160° F. and 240° F. a mixture containing linseed oil and a partially esterified tall oil produced by esterifying tall oil with pentaerythritol at a temperature between about 180° C. and about 250° C.

9. A linoleum cement obtained by oxidizing by agitating in air at a temperature between about 160° F. and 240° F. a mixture containing linseed oil, rosin, and a paritally esterified tall oil produced by esterifying tall oil in the presence of glycerol at a temperature between about 180° C. and about 250° C.

10. A linoleum cement obtained by oxidizing by agitating in air at a temperature between about 160° F. and 240° F. a mixture containing linseed oil, rosin, and a partially esterified tall oil produced by esterifying tall oil with pentaerythritol at a temperature between about 180° C. and about 250° C.

11. A linoleum cement obtained by oxidizing by agitating in air at a temperature between about 160° F. and 240° F. a mixture containing up to about 12.5% by weight of rosin, about 50% to 80% by weight of a linseed oil, and about 10% to 60% by weight of a partially esterified tall oil produced by esterifying tall oil in the presence of glycerol at a temperature between about 180° C. and about 250° C.

12. A linoleum cement obtained by oxidizing by agitating in air at a temperature between about 160° F. and 240° F. a mixture containing up to 12.5% by weight of rosin, about 50% to 80% by weight of linseed oil, and about 10% to 60% by weight of a partially esterified tall oil produced by esterifying tall oil by means of pentaerythritol at a temperature between about 180° C. and about 250° C.

13. A linoleum cement obtained by oxidizing by agitating in air at a temperature between about 160° F. and 240° F. a mixture comprised essentially of a siccative fatty oil and a partially esterified tall oil produced by selective esterification of only the fatty acid content of tall oil with a polyhydric alcohol containing 3–5 carbon atoms.

14. A linoleum cement obtained by oxidizing by agitating in air at a temperature between about 160° F. and 240° F. a mixture containing about 40% to 50% of a siccative fatty oil and about 50% to 60% by weight of a partially esterified tall oil produced by esterification of tall oil with a polyhydric alcohol containing 3–5 carbon atoms at a temperature between about 180° C. and about 250° C.

15. A linoleum cement obtained by oxidizing by agitating in air at a temperature between about 160° F. and 240° F. a mixture containing about 40% to 50% of a siccative fatty oil and about 50% to 60% by weight of a partially esterified tall oil produced by esterification of tall oil with pentaerythritol at a temperature between about 180° C. and about 250° C.

References Cited in the file of this patent

UNITED STATES PATENTS

| | | |
|---|---|---|
| 2,421,842 | Martin | June 10, 1947 |
| 2,439,377 | Bare et al. | Apr. 13, 1948 |
| 2,493,486 | Greenlee | Jan. 3, 1950 |
| 2,584,300 | Simmers | Feb. 5, 1952 |

FOREIGN PATENTS

| | | |
|---|---|---|
| 72,733 | Sweden | Jan. 9, 1929 |

OTHER REFERENCES

"Tall Oil,"—M. Hess, Paint Technology, August 1946, pp. 299–304, vol. XI, No. 128.

Chem. Abstracts (Ivanova), vol. 34, page 6462.